(12) United States Patent
Ramrattan et al.

(10) Patent No.: US 9,471,826 B2
(45) Date of Patent: Oct. 18, 2016

(54) DETERMINING FINGERPRINT SCANNING MODE FROM CAPACITIVE TOUCH SENSOR PROXIMATE TO LENS

(75) Inventors: Colin Shiva Ramrattan, Waterloo (CA); Robert James Lowles, Waterloo (CA); Graham Charles Townsend, Waterloo (CA)

(73) Assignee: BlackBerry Limited, Waterloo (CA)

( * ) Notice: Subject to any disclaimer, the term of this patent is extended or adjusted under 35 U.S.C. 154(b) by 1695 days.

(21) Appl. No.: 12/784,618

(22) Filed: May 21, 2010

(65) Prior Publication Data

US 2011/0286639 A1 Nov. 24, 2011

(51) Int. Cl.
*G06K 9/00* (2006.01)

(52) U.S. Cl.
CPC .................. *G06K 9/00033* (2013.01)

(58) Field of Classification Search
None
See application file for complete search history.

(56) References Cited

U.S. PATENT DOCUMENTS

| | | | |
|---|---|---|---|
| 6,532,035 B1 | 3/2003 | Saari et al. | |
| 2002/0003892 A1* | 1/2002 | Iwanaga | 382/124 |
| 2002/0083329 A1* | 6/2002 | Kiyomoto | 713/186 |
| 2002/0146157 A1 | 10/2002 | Goodman et al. | |
| 2003/0036365 A1 | 2/2003 | Kuroda | |
| 2003/0040346 A1 | 2/2003 | Fukuda et al. | |
| 2003/0234867 A1 | 12/2003 | Fujita et al. | |
| 2006/0008129 A1* | 1/2006 | Lee | G06K 9/00912 382/124 |
| 2008/0049982 A1* | 2/2008 | Nagasaka et al. | 382/115 |
| 2008/0055418 A1* | 3/2008 | Hsu | 348/207.99 |
| 2009/0179862 A1* | 7/2009 | Strong, IV | G06F 1/1616 345/169 |
| 2010/0048241 A1 | 2/2010 | Seguin et al. | |

FOREIGN PATENT DOCUMENTS

| | | |
|---|---|---|
| WO | 2004081852 A1 | 9/2004 |
| WO | 2006002674 A1 | 1/2006 |

OTHER PUBLICATIONS

EPO, Extended European Search Report, relating to application No. 10163575.3 dated Dec. 17, 2010.

Dongjae Lee et al: Recognizable-Image Selection for Fingerprint Recognition With a Mobile-Device Camera, IEEE Transaction on Systems, Man and Cybernetics. Part B:Cybernetics, IEEE Service Center, Piscataway, NJ, US, vol. 38, No. 1, Feb. 1, 2008, pp. 233-243.

* cited by examiner

*Primary Examiner* — Jayesh A Patel
(74) *Attorney, Agent, or Firm* — Ridout & Maybee LLP (57) ABSTRACT

A photography subsystem is configured to be operated in fingerprint scanning mode and a normal mode. An autofocus module may be initialized to control a lens with an initial focal length set according to received instructions indicating one of the modes of operation. An image signal processor associated with the photography subsystem may process images received from the photography subsystem and, if necessary, process the images to form a candidate digital fingerprint for use in an authentication process.

4 Claims, 8 Drawing Sheets

DETERMINING FINGERPRINT SCANNING MODE FROM CAPACITIVE TOUCH SENSOR PROXIMATE TO LENS

FIELD

The present application relates generally to authentication for a computing device and, more specifically, to fingerprint scanning with a camera.

BACKGROUND

As mobile telephones has received increasing amounts of computing power in successive generations, the mobile telephones have been termed "smart phones". Along with increasing amounts of computing power, such smart phones have seen increases in storage capacity and, consequently, increased utility. Beyond telephone functions, smart phones may now send and receive digital messages, be they formatted to use e-mail standards, Short Messaging Service (SMS) standards, Instant Messaging standards and proprietary messaging systems. Smart phones may also store, read, edit and create documents, spreadsheets and presentations. Accordingly, there have been increasing demands for smart phones with enhanced authentication functions.

BRIEF DESCRIPTION OF THE DRAWINGS

Reference will now be made to the drawings, which show by way of example, implementations of the present disclosure, and in which.

DETAILED DESCRIPTION

Rather than providing separate hardware for two distinct functions, photography and fingerprint capture, the functions may be carried out by a single subsystem. That is, a photography subsystem may be configured to be operated in fingerprint scanning mode and a normal mode. An autofocus module may be initialized to control a lens with an initial focal length set according to received instructions indicating one of the modes of operation. An image signal processor associated with the photography subsystem may process images received from the photography subsystem and, if necessary, process the images to form a candidate digital fingerprint for use in an authentication process.

According to an aspect of the present disclosure, there is provided a method of operating a photography subsystem. The method includes receiving input from a capacitive touch sensor proximate to a lens, responsive to the receiving, determining that the photography subsystem is to be operated in fingerprint scanning mode, operating the photography subsystem in fingerprint scanning mode, wherein operating the photography subsystem in fingerprint scanning mode includes initializing an autofocus module to control the lens with an initial focal length set for fingerprint capture, receiving, from an image sensor, a digital image and storing the digital image in a memory.

According to another aspect of the present disclosure, there is provided a photography subsystem. The photography subsystem includes a processor adapted to determine that the photography subsystem is to be operated in fingerprint scanning mode and operate the photography subsystem in fingerprint scanning mode.

According to a further aspect of the present disclosure, there is provided a computer readable medium containing computer-executable instructions. The instructions, when performed by a processor for a photography subsystem, cause the processor to determine that the photography subsystem is to be operated in fingerprint scanning mode and operate the photography subsystem in fingerprint scanning mode.

According to an even further aspect of the present disclosure, there is provided a method of operating an image signal processor to facilitate digital fingerprint capture. The method includes receiving, from a photography subsystem, a plurality of partial digital fingerprint images, forming, based on the plurality of partial digital fingerprint images, a candidate digital fingerprint and transmitting the candidate digital fingerprint. In other aspects of the present application, an image signal processor is provided for carrying out this method and a computer readable medium is provided for adapting a processor in an image signal processor to carry out this method.

Other aspects and features of the present disclosure will become apparent to those of ordinary skill in the art upon review of the following description of specific implementations of the disclosure in conjunction with the accompanying figures.

Figure 1:
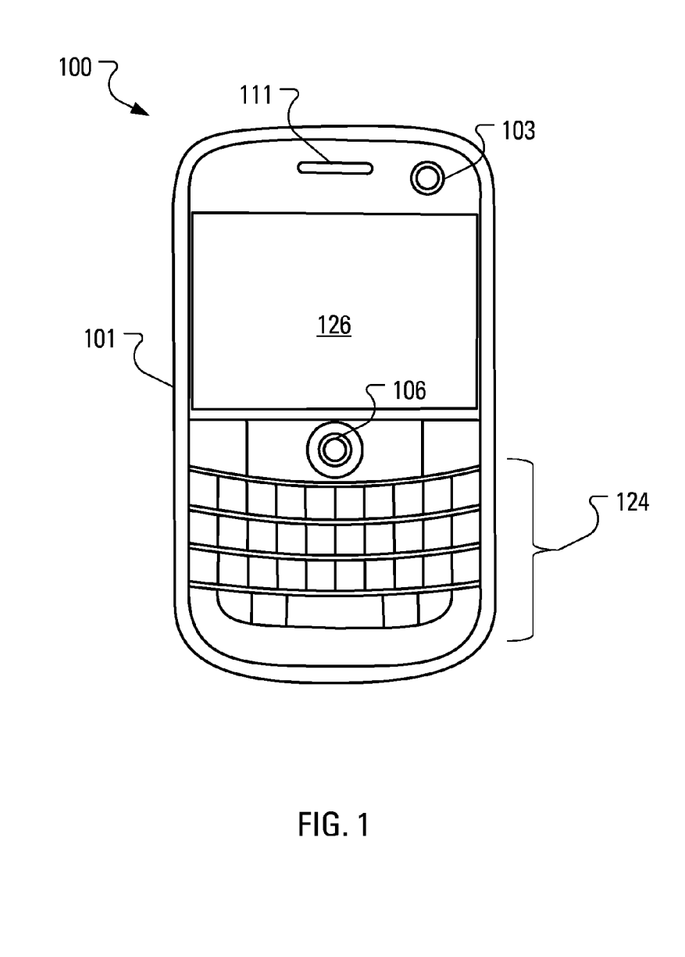
FIG. 1 illustrates an anterior side of a mobile communication device.

FIG. 1 illustrates an anterior side of a mobile communication device 100. Many features of the anterior side of the mobile communication device 100 are mounted within a housing 101 and include a display 126, a keyboard 124 having a plurality of keys, a speaker 111, a navigation device 106 (e.g., a touchpad, a trackball, a touchscreen, an optical navigation module) and an anterior (user-facing) lens 103A.

The mobile communication device 100 includes an input device (e.g., the keyboard 124) and an output device (e.g., the display 126), which may comprise a full graphic, or full color, Liquid Crystal Display (LCD). In some implementations, the display 126 may comprise a touchscreen display. In such touchscreen implementations, the keyboard 124 may comprise a virtual keyboard provided on the display 126. Other types of output devices may alternatively be utilized.

The housing 101 may be elongated vertically, or may take on other sizes and shapes (including clamshell housing structures). In the case in which the keyboard 124 includes keys that are associated with at least one alphabetic character and at least one numeric character, the keyboard 124 may include a mode selection key, or other hardware or software, for switching between alphabetic entry and numeric entry.

Figure 2:
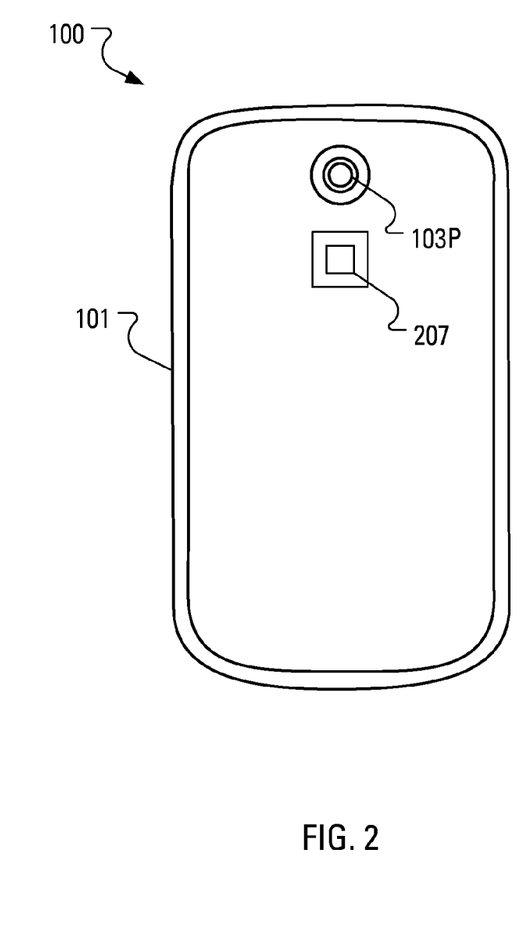
FIG. 2 illustrates a posterior side of the mobile communication device of FIG. 1.

FIG. 2 illustrates a posterior side of the mobile communication device 100. Included on the posterior side are a posterior lens 103P and a Light Emitting Diode (LED) 207 for use as a flash when using the mobile communication device 100 to capture, through the posterior lens 103P, a still photograph. The LED 207 may also be used as a torch to provide light when the mobile communication device 100 is used to capture, through the posterior lens 103P, video in low ambient light.

Figure 3:
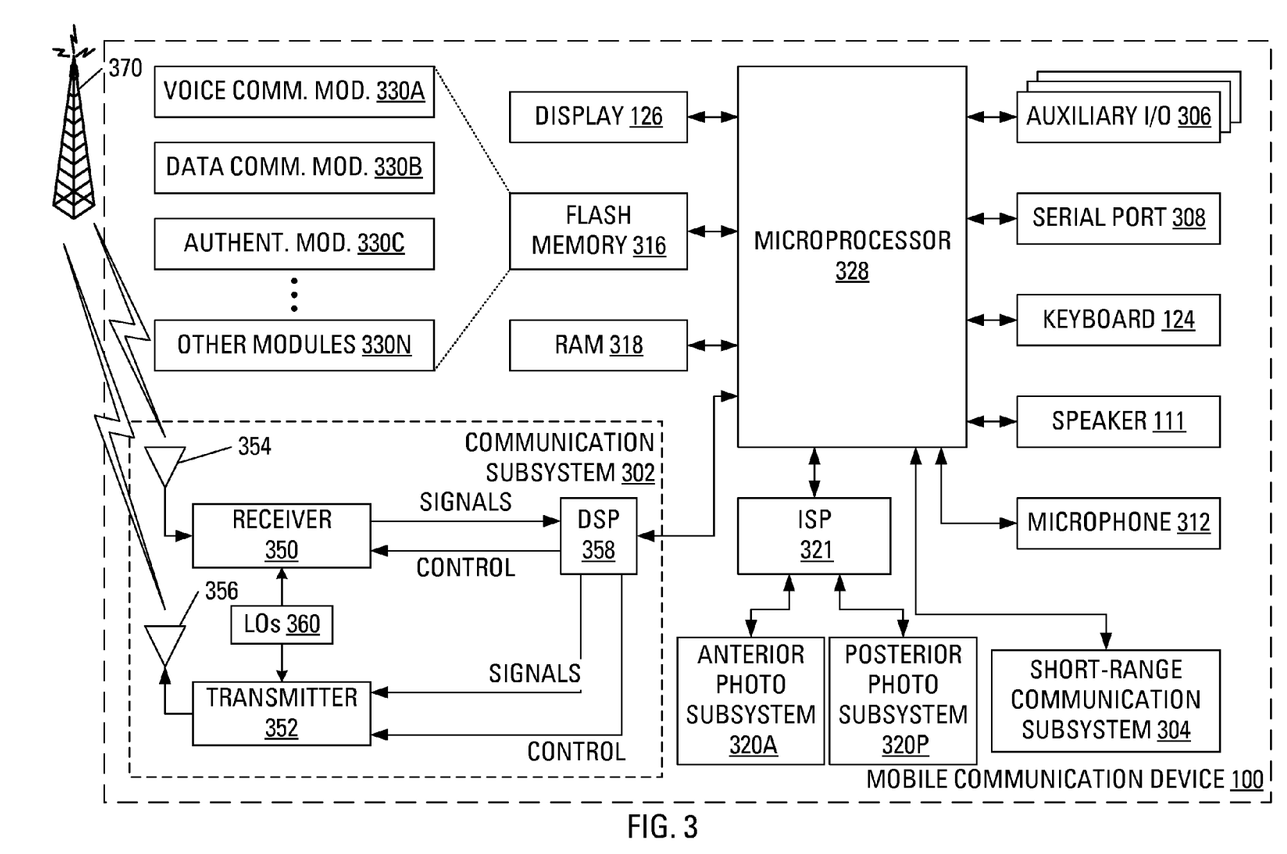
FIG. 3 illustrates an example arrangement of internal components of the mobile communication device of FIG. 1, in accordance with an implementation of the present disclosure.

FIG. 3 illustrates an example arrangement of internal components of the mobile communication device 100. A processing device (a microprocessor 328) is shown schematically in FIG. 3 as coupled between the keyboard 124 and the display 126. The microprocessor 328 controls the operation of the display 126, as well as the overall operation of the mobile communication device 100, in part, responsive to actuation of the keys on the keyboard 124 by a user.

In addition to the microprocessor 328, other parts of the mobile communication device 100 are shown schematically in FIG. 3. These may include a communications subsystem 302, a short-range communications subsystem 304, the keyboard 124 and the display 126. The mobile communication device 100 may further include other input/output devices, such as a set of auxiliary I/O devices 306, a serial port 308, the speaker 111 and a microphone 312. The mobile communication device 100 may further include memory devices including a flash memory 316 and a Random Access Memory (RAM) 318 as well as various other device subsystems. The mobile communication device 100 may comprise a two-way, radio frequency (RF) communication device having voice and data communication capabilities. In addition, the mobile communication device 100 may have the capability to communicate with other computer systems via the Internet.

Operating system software executed by the microprocessor 328 may be stored in a computer readable medium, such as the flash memory 316, but may be stored in other types of memory devices, such as a read only memory (ROM) or similar storage element. In addition, system software, specific device applications, or parts thereof, may be temporarily loaded into a volatile store, such as the RAM 318. Communication signals received by the mobile device may also be stored to the RAM 318.

The microprocessor 328, in addition to its operating system functions, enables execution of software applications on the mobile communication device 100. A predetermined set of software applications that control basic device operations, such as a voice communications module 330A and a data communications module 330B, may be installed on the mobile communication device 100 during manufacture. An authentication module 330C may also be installed on the mobile communication device 100 during manufacture, to implement aspects of the present disclosure. As well, additional software modules, illustrated as an other software module 330N, which may be, for instance, a PIM application, may be installed during manufacture. The PIM application may be capable of organizing and managing data items, such as e-mail messages, calendar events, voice mail messages, appointments and task items. The PIM application may also be capable of sending and receiving data items via a wireless carrier network 370 represented by a radio tower. The data items managed by the PIM application may be seamlessly integrated, synchronized and updated via the wireless carrier network 370 with the device user's corresponding data items stored or associated with a host computer system.

Communication functions, including data and voice communications, are performed through the communication subsystem 302 and, possibly, through the short-range communications subsystem 304. The communication subsystem 302 includes a receiver 350, a transmitter 352 and one or more antennas, illustrated as a receive antenna 354 and a transmit antenna 356. In addition, the communication subsystem 302 also includes a processing module, such as a digital signal processor (DSP) 358, and local oscillators (LOs) 360. The specific design and implementation of the communication subsystem 302 is dependent upon the communication network in which the mobile communication device 100 is intended to operate. For example, the communication subsystem 302 of the mobile communication device 100 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), Enhanced Data rates for GSM Evolution (EDGE), Universal Mobile Telecommunications System (UMTS), Wideband Code Division Multiple Access (W-CDMA), High Speed Packet Access (HSPA), etc. Other types of data and voice networks, both separate and integrated, may also be utilized with the mobile communication device 100.

Network access requirements vary depending upon the type of communication system. Typically, an identifier is associated with each mobile device that uniquely identifies the mobile device or subscriber to which the mobile device has been assigned. The identifier is unique within a specific network or network technology. For example, in Mobitex™ networks, mobile devices are registered on the network using a Mobitex Access Number (MAN) associated with each device and in DataTAC™ networks, mobile devices are registered on the network using a Logical Link Identifier (LLI) associated with each device. In GPRS networks, however, network access is associated with a subscriber or user of a device. A GPRS device therefore uses a subscriber identity module, commonly referred to as a Subscriber Identity Module (SIM) card, in order to operate on a GPRS network. Despite identifying a subscriber by SIM, mobile devices within GSM/GPRS networks are uniquely identified using an International Mobile Equipment Identity (IMEI) number.

When required network registration or activation procedures have been completed, the mobile communication device 100 may send and receive communication signals over the wireless carrier network 370. Signals received from the wireless carrier network 370 by the receive antenna 354 are routed to the receiver 350, which provides for signal amplification, frequency down conversion, filtering, channel selection, etc., and may also provide analog to digital conversion. Analog-to-digital conversion of the received signal allows the DSP 358 to perform more complex communication functions, such as demodulation and decoding. In a similar manner, signals to be transmitted to the wireless carrier network 370 are processed (e.g., modulated and encoded) by the DSP 358 and are then provided to the transmitter 352 for digital to analog conversion, frequency up conversion, filtering, amplification and transmission to the wireless carrier network 370 (or networks) via the transmit antenna 356.

In addition to processing communication signals, the DSP 358 provides for control of the receiver 350 and the transmitter 352. For example, gains applied to communication signals in the receiver 350 and the transmitter 352 may be adaptively controlled through automatic gain control algorithms implemented in the DSP 358.

In a data communication mode, a received signal, such as a text message or web page download, is processed by the communication subsystem 302 and is input to the microprocessor 328. The received signal is then further processed by the microprocessor 328 for output to the display 126, or alternatively to some auxiliary I/O devices 306. A device user may also compose data items, such as e-mail messages, using the keyboard 124 and/or some other auxiliary I/O device 306, such as the navigation device 106, a touchpad, a rocker switch, a thumb-wheel, a trackball, a touchscreen, or some other type of input device. The composed data items may then be transmitted over the wireless carrier network 370 via the communication subsystem 302.

In a voice communication mode, overall operation of the device is substantially similar to the data communication mode, except that received signals are output to the speaker 111, and signals for transmission are generated by a microphone 312. Alternative voice or audio I/O subsystems, such as a voice message recording subsystem, may also be implemented on the mobile communication device 100. In addition, the display 126 may also be utilized in voice communication mode, for example, to display the identity of a calling party, the duration of a voice call, or other voice call related information.

The short-range communications subsystem 304 enables communication between the mobile communication device 100 and other proximate systems or devices, which need not necessarily be similar devices. For example, the short-range communications subsystem may include an infrared device and associated circuits and components, or a Bluetooth™ communication module to provide for communication with similarly-enabled systems and devices.

An anterior photography subsystem 320A and a posterior photography subsystem 320P connect to the microprocessor 328 via an Image Signal Processor (ISP) 321. Indeed, the anterior photography subsystem 320A and the posterior photography subsystem 320P each include a communication interface (not shown) for managing communication with the ISP 321.

Figure 4:
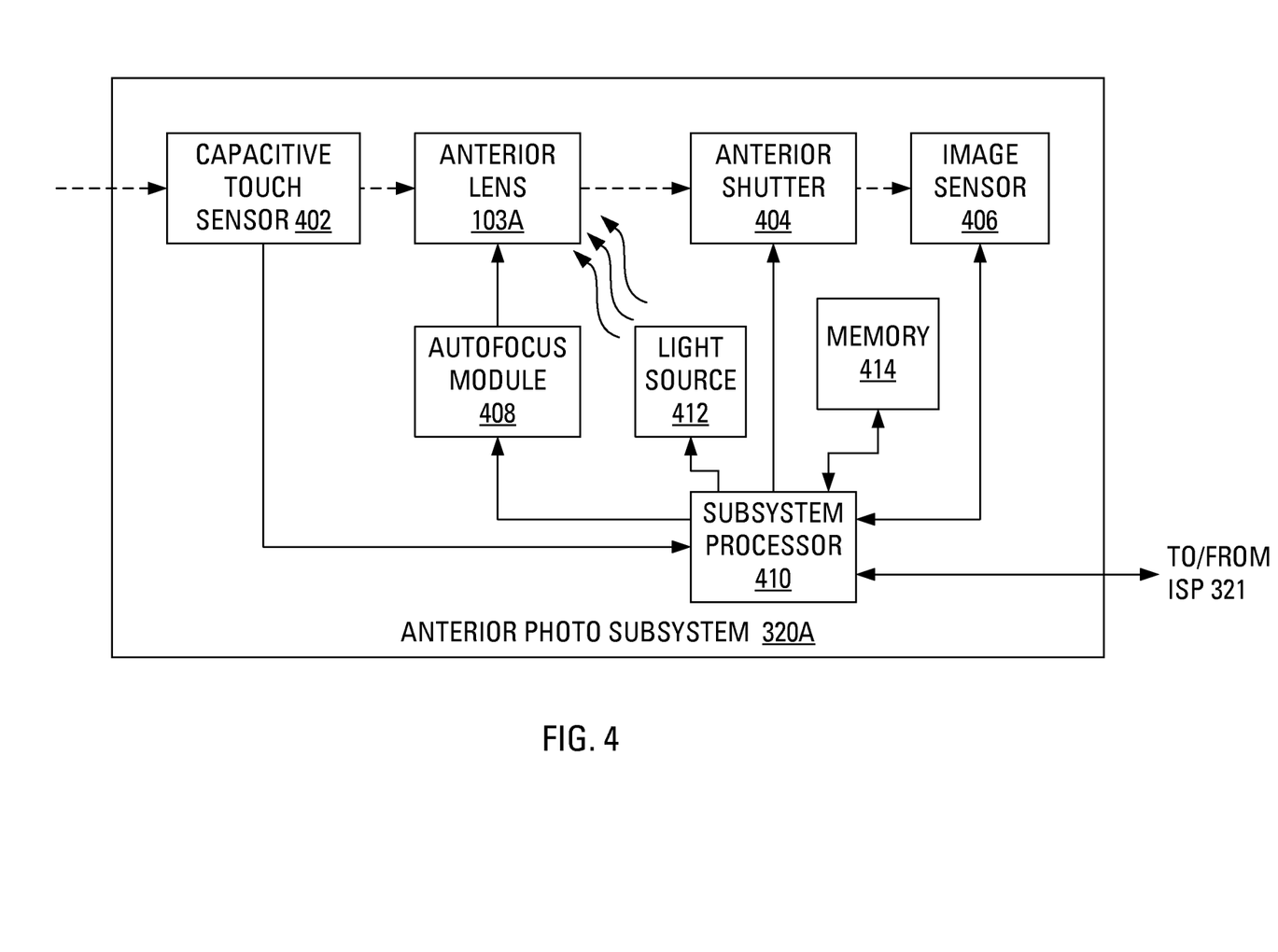
FIG. 4 illustrates an example anterior photography subsystem for the mobile communication device of FIG. 1, in accordance with an implementation of the present disclosure.

An example arrangement of components of the anterior photography subsystem 320A is schematically illustrated in FIG. 4 as including a capacitive touch sensor 402, the anterior lens 103A, an anterior shutter 404, an autofocus module 408, an image sensor 406, a light source 412, a memory 414 and an anterior photography subsystem processor 410. The capacitive touch sensor 402 is arranged to overlay the anterior lens 103A and communicate with the anterior photography subsystem processor 410. In a mechanical manifestation, the anterior shutter 404 may be arranged to selectively, under control of the anterior photography subsystem processor 410, allow light that passes through the anterior lens 103A to reach the image sensor 406. In an electronic manifestation, the function of the anterior shutter 404 may be accomplished by selectively activating portions of the image sensor 406. A shutter that implements a combination of mechanical and electronic shutter strategies is also available as a further alternative.

The anterior photography subsystem processor 410 also exerts control, via the autofocus module 408, over the focal length of the light that passes through the anterior lens 103A toward the image sensor 406. The light source 412 is also under control of the anterior photography subsystem processor 410.

A set of operating instructions may be installed in the memory 414 during manufacture, to allow the anterior photography subsystem processor 410 to implement aspects of the present disclosure.

The posterior photography subsystem 320P may include the posterior lens 103P with corresponding posterior shutter (not shown), the LED 207, an image sensor (not shown) and a posterior photography subsystem processor (not shown).

Figure 5:
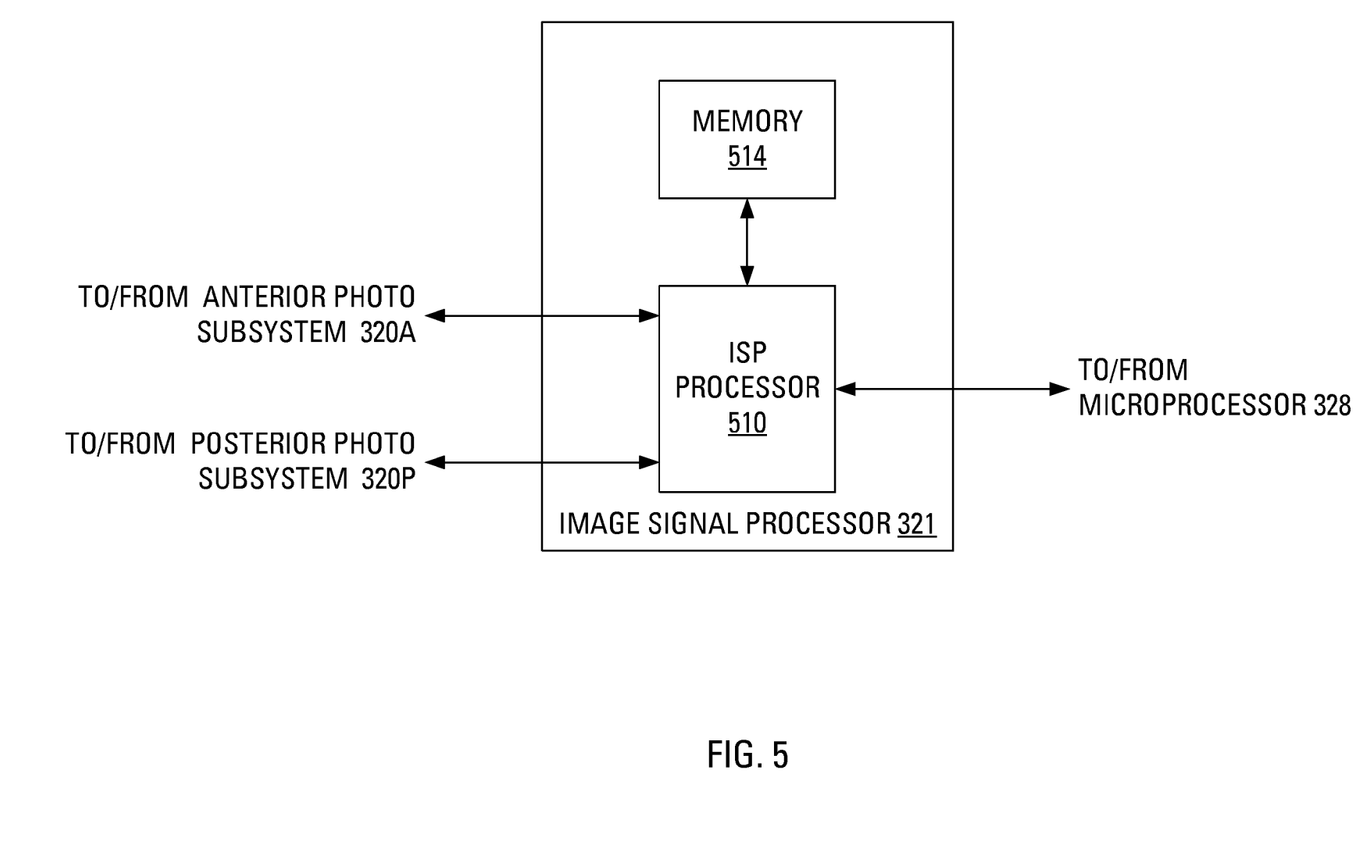
FIG. 5 illustrates an example image signal processor for the mobile communication device of FIG. 1, in accordance with an implementation of the present disclosure.

FIG. 5 illustrates an example of the components of the ISP 321 for the mobile communication device 100 of FIG. 1. In particular, the ISP 321 may include an ISP processor 510 and an ISP memory 514. The ISP memory 514 may be used to buffer received data and may also store computer readable instructions for use by the ISP processor 510. Notably, the ISP memory 514 is likely to be small and embedded within the ISP processor 510. The ISP memory 514 is shown separately merely for purposes of illustration and should not preclude the option that the ISP memory 514 is implemented in the ISP processor 510.

In overview, the anterior photography subsystem 320A may be used when obtaining a candidate fingerprint for the mobile communication device 100 (e.g., for authentication purposes). To accommodate such use of the photography subsystem 320A, the anterior photography subsystem 320A may be adapted, according to the present disclosure, to automatically adjust focal length from around one meter (e.g., for self portraits and video calls) to around one millimeter (e.g., for fingerprint capture).

The mobile communication device 100 may be arranged to have various security modes including, for example, a locked mode and an unlocked mode.

In locked mode, a user has limited access to the functions of the mobile communication device 100. The mobile communication device 100 may be capable of receiving incoming telephone calls or place an emergency telephone call while in locked mode. Additionally, the mobile communication device 100 may be capable of receiving messages (e.g., e-mail messages, Short Messaging Service messages, instant messenger messages, etc.), but the messages may not be viewed by the user while the device is in locked mode. The mobile communication device 100 can do little else but provide a dialog indicating that the mobile communication device 100 is in locked mode and indicating the action that is to be taken by the user to change the mode of the mobile communication device 100 to unlocked mode. Upon changing the mode of the mobile communication device 100 to unlocked mode, the user may be provided much greater access to the functionality of the mobile communication device 100.

When the mobile communication device 100 is in locked mode, there may exist a requirement that a user provide, to the mobile communication device 100, one or more forms of authentication input before the mobile communication device 100 will change over to unlocked mode. Such authentication input may take the form of input provided on the keyboard 124, where the input may be a password formed of alphanumeric characters and/or symbols. Alternatively or additionally, such authentication input may take the form of biometric input. Biometric input may include one or more fingerprints, retinal scans, face geometry scans, hand geometry scans, voice prints or speech prints, etc.

In recognition of the security provided by biometric authentication, manufacturers of mobile communication devices such as notebook computers, cellular telephones and so-called smart phones, which combine elements of notebook computers and cellular telephones, have been known to include a built-in fingerprint sensor in their products.

One example fingerprint sensor has a bar shape. A silicon sensor constructs a fingerprint as a user swipes a finger across the bar. Another example fingerprint sensor has a pad shape. A sensor constructs a fingerprint as a user holds a finger on the pad, which is designed with a size to accommodate an entire fingerprint.

It is proposed herein to employ the anterior photography subsystem 320A in place of a dedicated fingerprint sensor. However, such employment of the anterior photography subsystem 320A requires an optics system that can focus at both approximately 1 millimeter (for fingerprint capture) and 1 meter (for normal camera operation).

As will be clear to a person of skill in the art, in general, an anterior photography subsystem for a mobile communication device is not constantly in use. It is anticipated that the anterior photography subsystem 320A will occasionally be called upon, for example, to capture a photograph, to capture video or to capture a candidate digital fingerprint.

Figure 6:
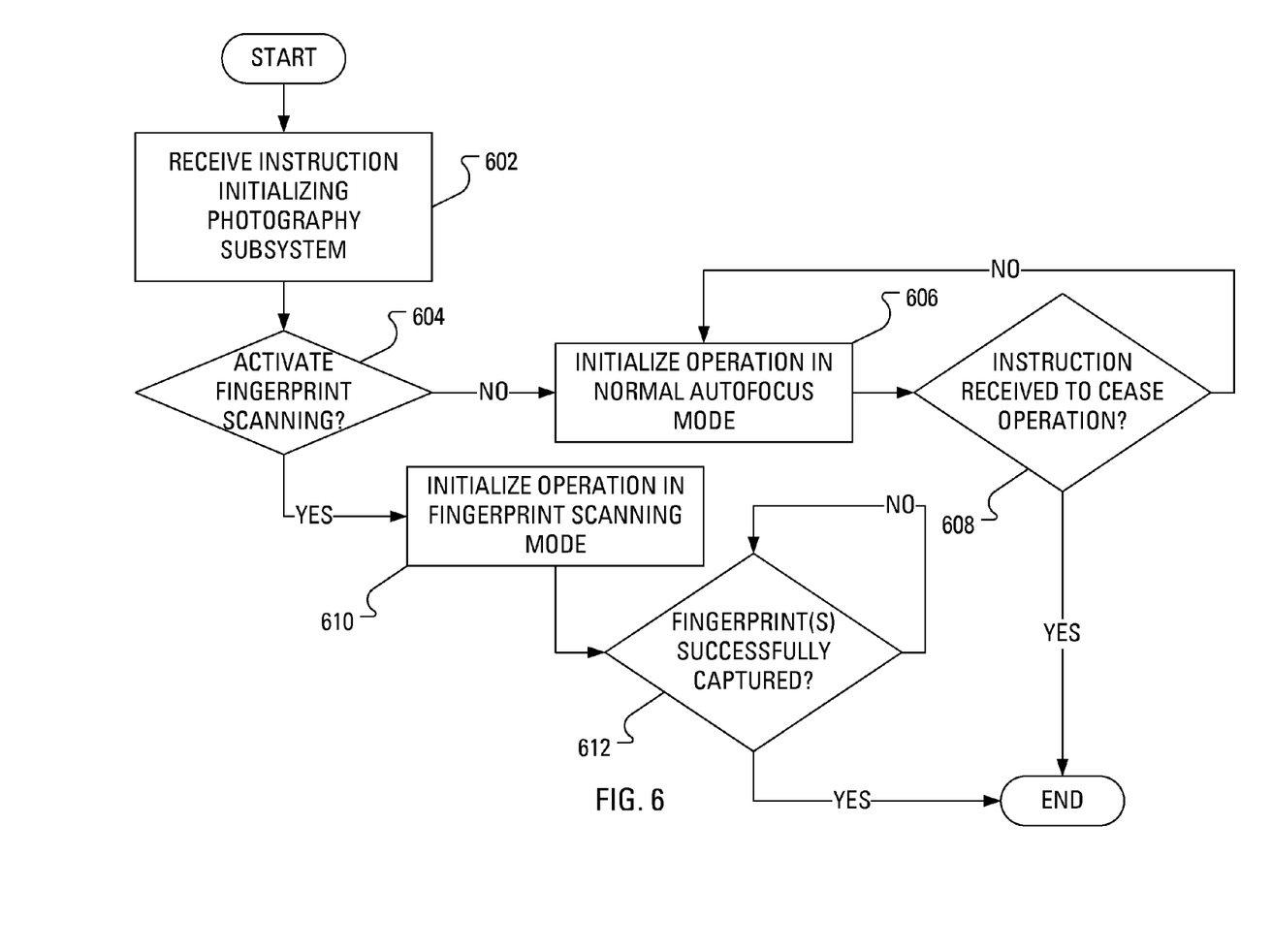
FIG. 6 illustrates example steps in a method of switching between a normal mode of operation and a fingerprint scanning mode of operation for the anterior photography subsystem of FIG. 4, in accordance with an implementation of the present disclosure.

In operation, in view of FIG. 6, the anterior photography subsystem 320A may be arranged to receive (step 602) an instruction from the ISP processor 510, where the instruction initializes operation of the anterior photography subsystem 320A. Responsive to receiving (step 602) the instruction, the anterior photography subsystem processor 410 may determine (step 604) whether fingerprint scanning mode is to be activated.

The instruction from the ISP processor 510 may be transmitted responsive to receipt, by the ISP processor 510, of an instruction from the microprocessor 328. In one implementation, the microprocessor 328 determines whether the anterior photography subsystem 320A is to operate in fingerprint scanning mode or normal mode and indicates a requested mode in the instruction to the ISP processor 510. It is expected that fingerprint scanning mode will be used most often when the mobile communication device 100 is in locked mode and that normal mode will be used most often when the mobile communication device 100 is in unlocked mode.

Accordingly, in one implementation, determining (step 604) whether fingerprint scanning mode is to be activated comprises reviewing the instruction received from the ISP processor 510 for an indication of a requested mode.

Upon determining (step 604) that fingerprint scanning mode is not to be activated, the anterior photography subsystem processor 410 may initialize (step 606) operation of the anterior photography subsystem 320A in a normal mode. In the normal mode, the autofocus module 408 operates based on initial conditions that specify that a photographic subject is approximately one meter away from the anterior lens 103A. The anterior photography subsystem 320A may continue to operate in the normal mode until the anterior photography subsystem processor 410 determines (step 608) that an instruction to cease operating has been received from the ISP processor 510.

Upon determining (step 604) that fingerprint scanning mode is to be activated, the anterior photography subsystem processor 410 may initialize (step 610) operation of the autofocus module 408 in a fingerprint scanning mode. In the fingerprint scanning mode, the autofocus module 408 operates based on initial conditions that specify that a photographic subject is approximately one millimeter away from the anterior lens 103A.

Focus at 1 mm (fingerprint scanning mode) may be achieved by physically moving the lens 103A or triggering the ISP 321 to employ digital processing techniques to achieve near field focus of 1 mm. In general, the autofocus module 408 may arrange either the physical option or the processor-based option individually or some combination of both options.

Furthermore, operation of the anterior photography subsystem 320A in the fingerprint scanning mode may also involve the anterior photography subsystem processor 410 activating the light source 412 to shed light on the finger from which a candidate digital fingerprint is to be captured. As the user moves the finger about, the anterior photography subsystem processor 410 may control the anterior shutter 404 to open and close at a predetermined rate (e.g., 2000 times per second), thereby allowing the image sensor 406 to capture multiple partial digital images of the finger. The image sensor 406 may pass the captured multiple partial digital images of the finger to the anterior photography subsystem processor 410. The anterior photography subsystem processor 410 may immediately pass the multiple partial digital images of the finger to the ISP 321. Alternatively, the anterior photography subsystem processor 410 may store the multiple partial digital images of the finger in the memory 414 for transmission to the ISP 321 at a later time.

The anterior photography subsystem 320A may continue to operate in the fingerprint scanning mode until the anterior photography subsystem processor 410 determines (step 612) that fingerprint capture is complete.

Figure 7:
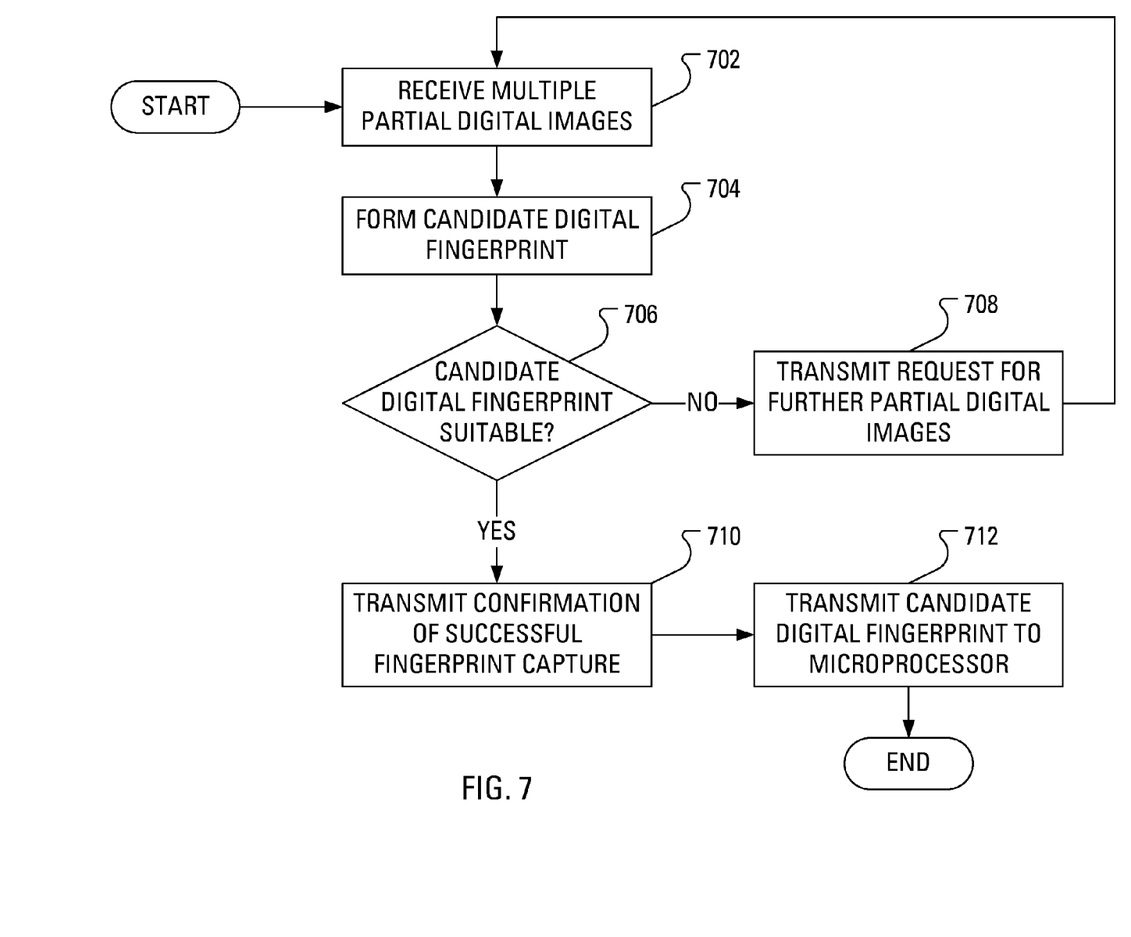
FIG. 7 illustrates example steps in a method of operation for the image signal processor of FIG. 5, in accordance with an implementation of the present disclosure.

As illustrated in FIG. 3, the anterior photography subsystem 320A and the posterior photography subsystem 320P connect to the same ISP 321. FIG. 7 illustrates example steps in a method of operation for the ISP processor 510.

It is proposed herein to configure the ISP processor 510 with image stitching algorithms such that the ISP processor 510 may, upon receipt (step 702) of the multiple partial digital images of the finger from the anterior photography subsystem 320A, combine the multiple partial digital images to form (step 704) a candidate digital fingerprint. The ISP may then determine (step 706) whether the formed candidate digital fingerprint is suitable for use by the authentication module 330C.

A typical fingerprint identification algorithm seeks to detect, in a candidate digital fingerprint, a number of "features" suitable to enable an adequate level of discrimination relative to other fingerprints not from the enrolled user. A candidate digital fingerprint may be determined (step 706) to be suitable for use by the authentication module 330C based on the detection, in the candidate digital fingerprint, of a number of features exceeding a predetermined threshold number of features. The predetermined threshold number of features is dependent on a level of discrimination desired (say, 1 in 1 000, 1 in 10 000, 1 in 1 000 000, etc.).

Upon determining (step 706) that the candidate digital fingerprint is not yet suitable for use by the authentication module 330C, the ISP processor 510 may transmit (step 708) a request to the anterior photography subsystem 320A for further partial digital images. Upon determining (step 706) that the candidate digital fingerprint is suitable for use by the authentication module 330C, the ISP processor 510 may transmit (step 710), to the anterior photography subsystem 320A, a confirmation that the fingerprint has been successfully captured. The ISP processor 510 may then transmit (step 712) the candidate digital fingerprint to the microprocessor 328.

Upon receiving the candidate digital fingerprint, the microprocessor 328 may implement the authentication module 330C to perform a conventional comparison of the received candidate digital fingerprint to a previously stored template digital fingerprint. The result of the comparison may be represented by a value representative of a degree of match between the candidate and the template. Based on the degree of match, the microprocessor 328 may unlock the mobile communication device 100 for use by the user.

As will be clear to a person of ordinary skill in the art, an authentication dialog presented on the display 126 under control of the microprocessor 328 may require a combination of password and one or more fingerprints to successfully unlock the mobile communication device 100. The use of a single fingerprint has been described above for simplicity of presentation.

As described above, in one implementation, determining (step 604) whether fingerprint scanning mode is to be activated comprises reviewing the instruction received from the ISP 321 for an indication of a requested mode. In another implementation, the instruction received from the ISP 321 may merely activate the anterior photography subsystem 320A and leave the decision the anterior photography subsystem processor 410. Determining (step 604) whether fingerprint scanning mode is to be activated may, in this implementation, comprise receiving (or not receiving) input from the capacitive touch sensor 402. Based on receiving input from the capacitive touch sensor 402, the anterior photography subsystem processor 410 may determine (step 604) that fingerprint scanning mode is to be activated. Based on a lack of input from the capacitive touch sensor 402, the anterior photography subsystem processor 410 may determine (step 604) that normal mode is to be activated.

Rather than setting initial conditions of the autofocus module 408 to arrange the anterior lens 103A to focus at one meter (FIG. 6, step 606) or one millimeter (FIG. 6, step 610), components of the anterior photography subsystem 320A may be arranged to capture multiple digital images at different focal distances. The anterior photography subsystem processor 410 may transmit each of the multiple digital images at different focal distances to the ISP 321.

Responsive to receiving the multiple digital images at different focal distances, the ISP processor 510 employs a digital image processing technique to combine the images to form an image with an extended depth of field (EDOF). Based on the active mode (e.g., normal or fingerprint scanning), the ISP processor 510 uses de-convolution algorithms to form a normal mode image or a candidate digital fingerprint.

Figure 8:
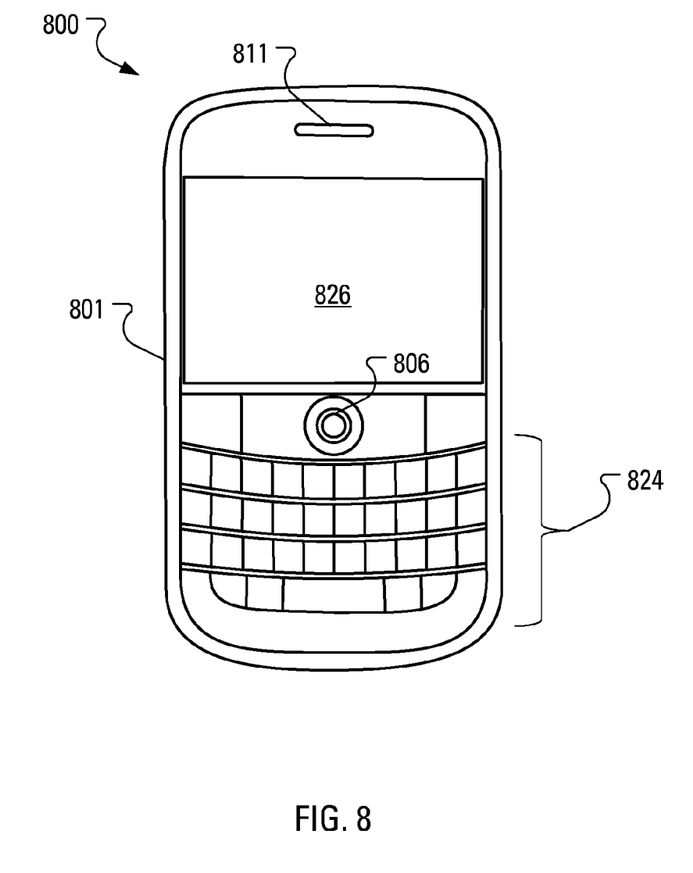
FIG. 8 illustrates an anterior side of a modified mobile communication device that is an alternative to the mobile communication device of FIG. 1, in accordance with an implementation of the present disclosure.

FIG. 8 illustrates an anterior side of a modified mobile communication device 800 that is an alternative to the mobile communication device 100 of FIG. 1. In common with the mobile communication device 100 of FIG. 1, the modified mobile communication device 800 includes features a display 826, a keyboard 824 having a plurality of keys and a speaker 811 mounted within a housing 801.

The modified mobile communication device 800 differs from the mobile communication device 100 of FIG. 1 in that a navigation device and an anterior (user-facing) lens have been combined into a single optical navigation module 806.

Instead of only being active upon receiving instruction from the microprocessor 328, an anterior photography and optical navigation subsystem (not shown) supporting the optical navigation module 806 may be required to be active while the mobile communication device 100 is in operation, such that the anterior photography and optical navigation subsystem may act in its navigation capacity to report navigation finger motion (up, down, left, right, etc.) to the microprocessor 328. The structure of the anterior photography and optical navigation subsystem may closely follow the structure of the anterior photography subsystem 320A illustrated in FIG. 4. The anterior photography and optical navigation subsystem may be configured to switch from a navigation mode to a fingerprint capture mode or from the fingerprint capture mode to the navigation mode responsive to an instruction to do so received from the ISP 321. The ISP processor 510 receives images from the anterior photography and optical navigation subsystem and processes determine a directional vector of any finger movement taking place.

Although the disclosure has concentrated on the anterior photography subsystem 320A as a component to capture fingerprints, it should be clear that, if desired, the posterior photography subsystem 320P may be used, additionally or alternatively, to capture images from which may be formed a candidate digital fingerprint.

The above-described implementations of the present application are intended to be examples only. Alterations, modifications and variations may be effected to the particular implementations by those skilled in the art without departing from the scope of the application, which is defined by the claims appended hereto.

What is claimed is:

1. A method of operating a photography subsystem, the method comprising:
   receiving input from a finger on a capacitive tough sensor proximate to a lens;
   responsive to the receiving, determining that the photography subsystem is to be operated in fingerprint scanning mode;
   operating the photography subsystem in fingerprint scanning mode, wherein operating the photography subsystem in fingerprint scanning mode includes initializing an autofocus module to control the lens with an initial focal length set for capturing a fingerprint from said finger;
   receiving, from an image sensor, a digital image;
   storing the digital image in a memory;
   transmitting the digital image to an image signal processor;
   receiving, from the image signal processor, a request for further digital images; and
   responsive to the receiving the request, receiving a further digital image and the transmitting the further digital image to the image signal processor.

2. A photography subsystem comprising:
   a lens;
   an autofocus module adapted to control the lens;
   a capacitive touch sensor proximate to the lens;
   a communication interface for managing communication with an image processor;
   a processor adapted to:
   receive input from a finger on the capacitive touch sensor;
   based on the input, determine that the photography subsystem is to be operated in fingerprint scanning mode; and
   operate the photography subsystem in fingerprint scanning mode by initializing the autofocus module to control the lens with an initial focal length set for capturing a fingerprint from said finger; wherein the processor is further adapted to trigger, via the communication interface; the image processor to employ digital processing techniques to achieve near field focus.

3. A non-transitory computer readable medium containing computer-executable instructions that, when performed by a processor for a photography subsystem, cause the processor to:
- receive input from a finger on a capacitive touch sensor proximate to a lens;
- determining that the photography subsystem is to be operated in fingerprint scanning mode; and
- operate the photography subsystem in fingerprint scanning mode by initializing an autofocus module to control the lens with an initial focal length set for capturing a fingerprint from said finger: wherein the instructions further cause the processor to trigger, via a communication interface, an image processor to employ digital processing techniques to achieve near field focus.

4. A non-transitory computer readable medium containing computer-executable instructions that, when performed by a processor for a photography subsystem, cause the processor to:
- receive input from a finger on a capacitive touch sensor proximate to a lens;
- determine that the photography subsystem is to be operated in fingerprint scanning mode; and
- operate the photography subsystem in fingerprint scanning mode by initializing an autofocus module to control the lens with an initial focal length set for capturing a fingerprint from said finger; wherein the instructions further cause the processor to trigger, via a communication interface, an image processor to employ digital processing techniques to achieve near field focus, wherein the near field focus has a focal length of 1 millimeter.

* * * * *